United States Patent [19]

Inoue

[11] 4,382,820

[45] May 10, 1983

[54] STRUCTURAL COMPOSITION FOR MACHINE TOOL BODIES AND MEMBERS

[75] Inventor: Kiyoshi Inoue, Tokyo, Japan

[73] Assignee: Inoue-Japax Research Incorporated, Yokohama, Japan

[21] Appl. No.: 238,667

[22] Filed: Feb. 27, 1981

[30] Foreign Application Priority Data

Feb. 27, 1980 [JP] Japan ................. 55-22770
Jun. 9, 1980 [JP] Japan ................. 55-77463

[51] Int. Cl.³ ............................................. C04B 7/02
[52] U.S. Cl. ........................................ 106/90; 106/97; 106/99
[58] Field of Search ............................. 106/97, 90, 99; 264/271.1, 279.1

[56] References Cited

U.S. PATENT DOCUMENTS

| 3,021,291 | 2/1962 | Thiessen | 106/97 |
| 3,166,518 | 1/1965 | Barnard | 106/97 |
| 3,758,319 | 9/1973 | Ergene | 106/99 |
| 3,834,916 | 9/1974 | Kesler | 106/99 |
| 3,962,142 | 6/1976 | Freeman et al. | 106/97 |
| 4,019,919 | 4/1977 | DeSalvo | 106/97 |
| 4,075,027 | 2/1978 | Knill et al. | 106/99 |

FOREIGN PATENT DOCUMENTS

| 383475 | 11/1932 | United Kingdom | 106/99 |
| 789987 | 1/1958 | United Kingdom | 106/36 |
| 1068163 | 5/1967 | United Kingdom | 106/99 |
| 1166380 | 10/1969 | United Kingdom | 501/124 |
| 1272410 | 4/1972 | United Kingdom | 106/99 |

*Primary Examiner*—James Poer
*Attorney, Agent, or Firm*—Karl F. Ross; Herbert Dubno

[57] ABSTRACT

A structural member for a machine tool is formed of a nonmetallic substance, e.g. cement, concrete cement or ceramic, having discrete solid objects, e.g. fibers, filaments, chips, fragments and/or particles, of a metal, carbon, ceramic, cermet and/or plastic dispersively distributed therein as reinforcing elements. Metallic frames may be embedded in the nonmetallic substrate to form a skeleton for the member.

8 Claims, 10 Drawing Figures

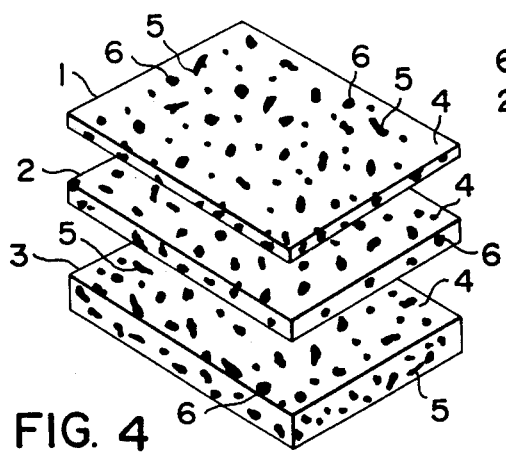
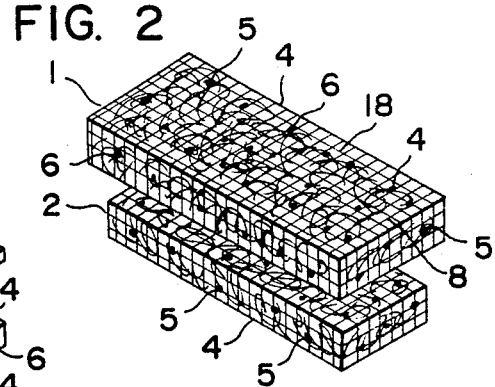
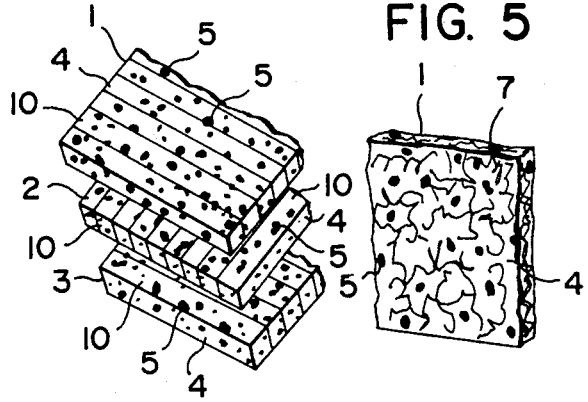
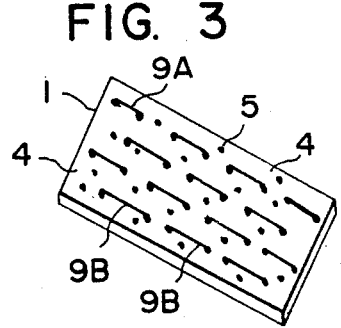
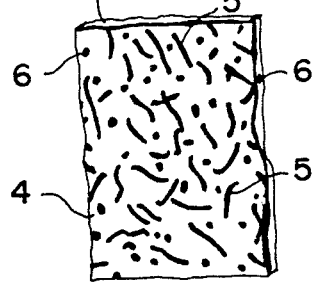
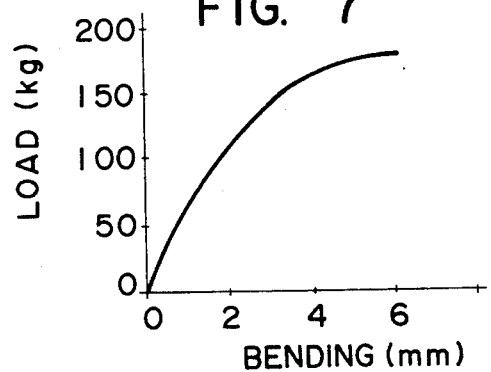

STRUCTURAL COMPOSITION FOR MACHINE TOOL BODIES AND MEMBERS

FIELD OF THE INVENTION

The present invention relates to machine tool bodies and, more particularly to an improved composition of a structure member of a machine tool such as an electroerosion machine.

BACKGROUND OF THE INVENTION

Heretofore, structural members of a machine tool, i.e. the machine proper and parts thereof such as a column, frames and bed, have been composed of a metal such as cast iron. While the metallic structural composition processes many favorable properties such as rigidity, wear resistance, capability of localized heat-treatment, machinability and ease of assembling as generally desired for machine structural members, it presents a variety of disadvantages and inconveniences as well. Thus, a dimensional change is thermally caused in a metallic machine tool structure in the machining process and may produce a critical effect on the machining precision and require thermal insulation and other complicated countermeasures which add to the cost of the machine tool. Further, these members naturally tend to rust and also are poor in vibration absorptivity and require electrical insulation.

OBJECTS OF THE INVENTION

It is accordingly an important object of the present invention to provide an improved and nonmetallic structural composition for a machine tool body or parts thereof.

Another object of the invention is to provide a structural member for a machine tool having a unique and nonmetallic composition.

SUMMARY OF THE INVENTION

In accordance with the present invention there is provided a novel composition of a structural member of a machine tool, essentially consisting of a nonmetallic substance, e.g. cement, ceramic or concrete, having discrete solid objects dispersively distributed therein, preferably in an amount of 0.5 to 30% by weight, advantageously not greater than 15% by weight, as reinforcing elements. The discrete solid objects are of a material selected from the group consisting of metals, alloys, carbon, ceramics, cermets and plastics and may be of an oxide (such as $SiO_2$ and $Al_2O_3$), a carbide (such as $B_4C$, $SiC$ and $TiC$), a nitride (such as $TiN$ and $BN$), a boride (such as $TiB_2$) and diamond. The plastics may be polypropylene, polyoxymethylene resin, polyamide resin, nylon resin, epoxy resin or polyethylene resin. The discrete solid objects may be in any of such forms as fibers, filaments, wires, chips, pieces, fragments, particles and flakes.

Preferably, a portion of these discrete solid objects should be of a magnetic material such as $Fe_2O_3$ and $Fe_3O_4$ and, when the composition of the nonmetallic substance and the discrete solid objects is formed i.e. baked or hardened, a magnetic field should be applied to the composition to magnetically orient these portions, thereby improving the dispersivity of the distributed objects and the reinforcing structural strength of the member.

It has been found that an essentially nonmetallic composition according to the present invention is markedly less subject to deformation and to vibration and possesses quite a satisfactory hardness and rigidity withstanding a greater load. Further, the thermal expansion is reduced markedly compared with the metallic composition. Accordingly, a highly satisfactory structural member for a machine tool is provided. The member naturally is rust-free and requires no electrical insulation.

According to a further feature of the invention, frames of a metallic composition such as steel may be embedded, as a skeleton for the structural member of a machine tool, in the nonmetallic substance.

BRIEF DESCRIPTION OF DRAWINGS

These and other objects, features and advantages of the present invention will become more readily apparent from the following description of certain embodiments thereof taken with reference to the accompanying drawing in which:

FIG. 1 is a perspective view diagrammatically illustrating a body of a machine tool member composed according to the invention and as cut and sliced into three plates for convenience of the explanation;

FIG. 2 is a similar view diagrammatically illustrating a body of a machine tool member of a modified composition according to the invention and as cut and sliced into two plates;

FIGS. 3 through 6 are similar diagrammatic views of further embodiments of the invention;

FIG. 7 is a graph representing a load-bending characteristic of a structural body of a composition according to the invention;

SPECIFIC DESCRIPTION

Figure 9:
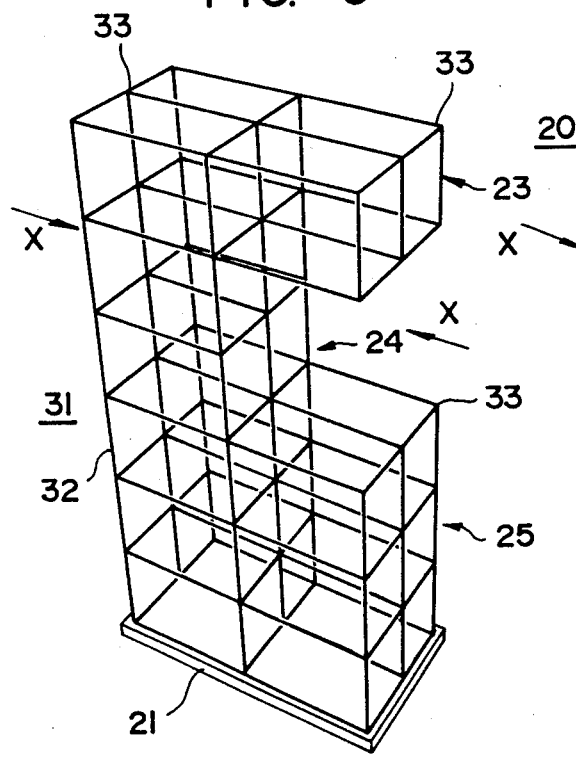
FIG. 9 is a perspective view diagrammatically illustrating a frame structure to be embedded in a body of the composition of the invention to form the member of FIG. 8.

Referring first to FIG. 1, an exemplary body of composition formed according to the invention to constitute a structural member for a machine tool is shown as cut and broken into three plates 1, 2 and 3. The body consists of a substrate 4 of a nonmetallic substance, e.g. cement, concrete or ceramic, having discrete solid objects 5 and 6 dispersively distributed uniformly throughout the substrate 4. Here, the objects denoted by numeral 5 may be broken wires of, say, stainless-steel wires included at a proportion of 0.5% by weight in the body. The objects denoted by numeral 6 may be spherical particles of a ceramic, say composed of titanium nitride and included at a proportion of 0.5% by weight in the body. The composition is contained in a suitable mold and hardned when the substrate 4 is cement or concrete, or baked when the substrate 4 is ceramic. When these solid objects 5 and 6 are contained in an amount of 4% by weight, it has been found that the bending resistance of the body is increased to more than six times.

The body shown in FIG. 2 sliced into two pieces 1 and 2 makes use, as discrete solid objects, of metal particles 5, ceramic particles 6, broken plastic fibers 8 and elongated plastic fibers 18, uniformly distributed in the substrate 4 which may again be a cement, ceramic or concrete. These objects are mixed with the latter when in a semi-fluid state and then baken or hardened. Many such pieces 1, 2 may first be formed and then stacked and finally baked or cemented.

The body of FIG. 3 contains, in addition to broken metal wires 5, metal chips or curls 9A and 9B, as discrete solid objects, regularly aligned in the nonmetallic substrate 4. When metal chips or curls 9A and 9B are magnetic, an external magnetic field may be applied to the body when or before baked or set to magnetically orient these bodies. It has been found that a body formed in the presence of magnetic objects and under a magnetic field shows an increase in the bending resistance up to 20% in the N-S pole direction.

In the embodiment of FIG. 4, a plurality of elementary formed bodies 10 each consisting of the nonmetallic substrate having metallic particles 5 distributed therein are cemented or baked together into an unitary body 1, 2, 3 and then the bodies 1, 2 and 3 are arranged transversely to one another and baked or cemented into a single body. FIG. 5 shows a body consisting of the nonmetallic substrate 4 having metallic particles 5 and plastic, ceramic or metal fibers 7 uniformly distributed therein and cemented or baked. FIG. 6 shows a body consisting of the nonmetallic substrate 4 having particles of a metal, ceramic and plastic in the form of broken wires and spheres 5 and 6 distributed uniformly therein and baked or cemented. A plastic generally requires a greater volume than a metal and ceramic for a given weight proportion. It has been confirmed that these fibers, chips and fragments when added increases markedly the internal bond strength of the nonmetallic substrate.

EXAMPLE I

Samples containing ferrous metal fibers in varying amounts in a portland cement are prepared and are found to exhibit increases in the bending resistance as shown in the following table:

| Sample No. | Amount of metal fibers (wt %) | Bending resistance (times) |
| --- | --- | --- |
| blank | 0 | 1 |
| No. 1 | 1 | 3.2 |
| No. 2 | 2 | 6.5 |
| No. 3 | 4 | 6.8 |
| No. 4 | 4* | 8.2 |

*A magnetic field is applied during cementation.

The relationship between the load and the bending resistance for sample No. 4 is shown in the graph of FIG. 7. The ferrous metallic fibers are ones yielded from the lathing of a magnetic steel workpiece. The sample has a square rod of 10 mm thick and 30 mm long and is supported to make free at its two end with the varying loads applied at its center.

Figure 8:
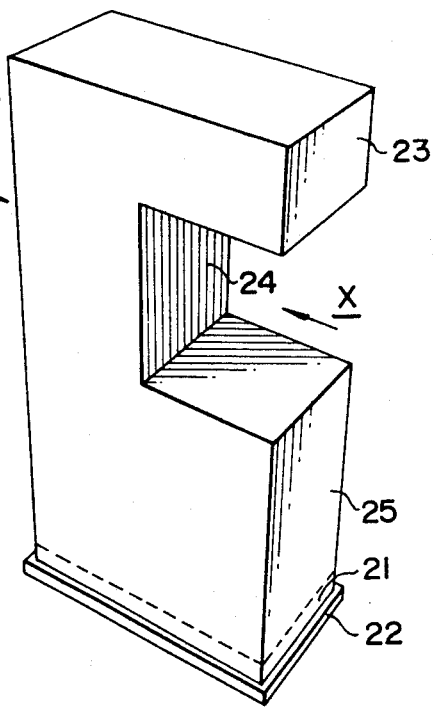
FIG. 8 is a perspective view diagrammatically illustrating a structural member formed according to the present invention.
Figure 10:
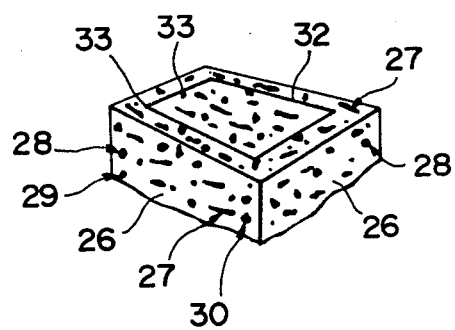
FIG. 10 is a perspective diagrammatic view of the member cut along the line X—X in FIGS. 8 and 9.

FIG. 8 shows an integral head/column/bed member 20 securely mounted on a plate 21 on a base 22 for a machine tool. The member 20 has a head portion 23, a column portion 24 and a bed portion 25, integrally consisting of a nonmetallic substance 26 having discrete solid objects 27, 28, 29 and 30 (FIG. 10) uniformly distributed therein. In addition, a skeleton 31 consisting of metallic frames 32 as shown in FIG. 9 is embedded in the nonmetallic substrate 26. In manufacture, frames 32 are assembled on the base plate 21 (FIG. 9) and secured at junctions 33 to form the skeleton 31. A mold (not shown) is prepared in which the skeleton 31 is fixed. Then a mixture of a cement, concrete or ceramic 26 precursor and discrete solid objects 27, 28 29 and 30 is loaded and baked or set. For example, the objects 27 my be broken stainless steel wires, the objects 28 silica particles, the objects 29 titanium-nitride particles and the objects 30 nylon fibers; the substrate 26 a concrete cement.

EXAMPLE II

A semi-solid cement mortar 26 is prepared by adding to a concrete cement mortar an amount of 1.5% by weight boron-nitride particles and an appropriate amount of acrylate emulsion. Then the semi-solid cement mortar 26 incorporates 5 % by weight stainless-steel wires 27 each having a diameter of 3 mm and a length of 50 mm, 5% by weight alumina particles 29 of a particle size in the order of microns, 3% by weight fragmentary filaments of polyethylene resin 30 each having a diameter of 0.2 mm and a length ranging between 20 and 70 mm and 2% by weight graphite chips 27. The reinforced concrete cement that results has a breaking strength of 310 kg/cm$^2$. In the process of cementation, when a magnetic field of 1 KOe is applied to the mixture being set, the breaking strength is increased to 420 kg/cm$^2$.

The structural composition for a machine tool according to the present invention provides many prominent advantages, some of which can be summarized as follows: (1) thermal expansion and shrinkage if any is extremely stable, (2) vibration-damping power increased by more than 50%, (3) stable in a prolonged time span and (4) extreme ease of manufacture.

The distribution of solid discrete objects in the nonmetallic substance can be controlled in any desired manner. For example, discrete objects of a low-friction material such as boron nitride may be distributed in a greater concentration in the superfacial zone of a member or body so that the latter zone can present an excellent sliding surface. It is also convenient for metal chips to be distributed in a greater concentration at a portion of one member which serves to mount another member or part thereon.

There is thus provided, in accordance with the present invention, an improved composition for a structural member of a machine tool, especially such machines as electroerosion machines for operation over a prolonged time span.

What is claimed is:

1. A method of making a structural member for a machine tool which comprises the steps of:
   (a) dispersing in a mass of a hardenable nonmetallic substance, a multiplicity of discrete solid objects forming reinforcing elements and in an amount comprising 0.5 to 30% by weight of the resulting composition;
   (b) shaping said composition into a configuration corresponding to the shape of the structural member and including at least a machine tool bed and a machine tool column extending upwardly from said bed; and
   (c) hardening the mass of the shaped composition to form the structural member as a rigid body with said elements distributed throughout said column and bed.

2. The method defined in claim 1 wherein the amount of said elements distributed in said body is not greater than 15% by weight thereof.

3. The method defined in claim 1 wherein said mass is cement, ceramic or concrete.

4. The method defined in claim 3 wherein said elements are selected from the group which consists of metals, carbon, ceramics, cermets and plastics.

5. The method defined in claim 1 wherein said elements consist at least in part of magnetic meterial.

6. The method defined in claim 1, further comprising the steps of embedding a frame in said body prior to the hardening thereof.

7. A machine tool support member comprising a bed, a column rising from said bed, and a head extending from said column and overlying said bed, said head, column and bed being formed unitarily from a hardened mass of nonmetallic material selected from the group which consists of cement, ceramic and concrete containing dispersed and embedded therein, 0.5 to 15% by weight of discrete solid objects selected from the group which consists of metals, carbon, ceramics, cermets and plastics and reinforcing said mass without rendering the same significantly thermally or electrically conductive thereto.

8. The machine tool support defined in claim 7, further comprising a metallic skeleton embedded in said mass and extending into said head, bed and column.

* * * * *

REEXAMINATION CERTIFICATE (255th)
United States Patent [19]

Inoue

[11] B1 4,382,820

[45] Certificate Issued Sep. 25, 1984

[54] STRUCTURAL COMPOSITION FOR MACHINE TOOL BODIES AND MEMBERS

[75] Inventor: Kiyoshi Inoue, Tokyo, Japan

[73] Assignee: Inoue-Japax Research Incorporated, Yokohama, Japan

Reexamination Request:
No. 90/000,442, Sep. 6, 1983

Reexamination Certificate for:
Patent No.: 4,382,820
Issued: May 10, 1983
Appl. No.: 238,667
Filed: Feb. 27, 1981

[30] Foreign Application Priority Data

Feb. 27, 1980 [JP] Japan ................................. 55-22770
Jun. 9, 1980 [JP] Japan ................................. 55-77463

[51] Int. Cl.$^3$ ............................................. C04B 7/02
[52] U.S. Cl. ........................................ 106/90; 106/97; 106/99
[58] Field of Search ......................... 106/90, 97, 99; 264/271.1, 279.1

[56] References Cited

U.S. PATENT DOCUMENTS

| | | | |
|---|---|---|---|
| 3,834,916 | 9/1974 | Kesler | 106/99 |
| 3,962,142 | 6/1976 | Freeman et al. | 106/97 |
| 4,019,919 | 4/1977 | DeSalvo | 106/97 |
| 4,075,027 | 2/1978 | Knill et al. | 106/99 |

FOREIGN PATENT DOCUMENTS

| | | | |
|---|---|---|---|
| 612610 | 8/1979 | Switzerland . | |
| 383475 | 11/1932 | United Kingdom | 106/99 |
| 789987 | 1/1958 | United Kingdom | 106/36 |
| 1068163 | 5/1967 | United Kingdom | 106/99 |
| 1166380 | 10/1969 | United Kingdom | 501/124 |
| 1272410 | 4/1972 | United Kingdom | 106/99 |

OTHER PUBLICATIONS

H. Grab et al: *Werkstatt und Betrieb* 109, (1976), 4, "Concrete in Machine Tool Construction".

N. A. Butterworth et al: "Concrete in Machine Tools", *Machinery and Production Engineering*, 116, (1970), 2999, S 703-709.

H. Kent-Norris: "Concrete for Machine Tools", *The Engineer* LXX (1940), p. 187.

*Primary Examiner*—James Poer

[57] ABSTRACT

A structural member for a machine tool is formed of a nonmetallic substance, e.g. cement, concrete cement or ceramic, having discrete solid objects, e.g. fibers, filaments, chips, fragments and/or particles, of a metal, carbon, ceramic, cermet and/or plastic dispersively distributed therein as reinforcing elements. Metallic frames may be embedded in the nonmetallic substrate to form a skeleton for the member.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 5, 7, and 8 are cancelled.

Claims 1-3 and 6 are determined to be patentable as amended.

New claims 9-13 are added and determined to be patentable.

1. A method of making a [structural member for a] machine tool *frame comprising a plurality of structural portions including a bed portion, a column portion extending upwardly from the bed portion and at least one further portion completing said frame*, which *method* comprises the steps of:
   (a) dispersing in a mass of a hardenable nonmetallic substance, a multiplicity of discrete, *fibrous metallic* [solid] objects [forming reinforcing elements and] in an amount *of* [comprising] 0.5 to 30% by weight of the resulting composition;
   (b) shaping said composition into a configuration corresponding to the shape of *said machine tool frame* [the structural member and including at least a machine tool bed and a machine tool column extending upwardly from bed]; and
   (c) hardening the mass of [the] *said* shaped composition to form [the structural member] *said machine tool frame* as a rigid, *unitary* body with said [elements] *discrete, fibrous metallic objects* distributed throughout said frame [column and bed] *to reinforce the mass without rendering the same significantly thermally or electrically conductive.*

2. The method defined in claim 1 wherein the amount of said [element] *objects* distributed in said body is not greater than 15% by weight thereof.

3. The method defined in claim [1] *2* wherein said mass is *a* cement, ceramic or concrete.

6. The method defined in claim 1, further comprising the steps of embedding a [frame] *skeleton* in said body prior to the hardening thereof.

9. *The method defined in claim 1, further comprising, prior to step (b), dispersing in said mass, a multiplicity of additional discrete objects composed of at least one substance selected from the group which consists of carbon, ceramics, cements and plastics.*

10. *A method of making a machine tool frame comprising a plurality of structural portions including at least a bed portion and a column portion, which method comprises the steps of:*
   *(a) dispersing in a mass of hardenable nonmetallic substance, a multiplicity of discrete solid objects in an amount of 0.5 to 30% by weight of the resulting composition, said objects consisting at least in part of a magnetic material;*
   *(b) shaping said composition into a configuration corresponding to the shape of said machine tool frame; and*
   *(c) externally applying a magnetic field to the mass of said shaped composition while hardening said mass to form said machine tool frame as a continuous, rigid body unitarily constituting said portions with said objects distributed throughout said frame to reinforce the mass without rendering the same significantly thermally or electrically conductive.*

11. *A machine tool frame comprising a plurality of structural portions including a bed portion, a column portion rising from said bed portion and a head portion extending from said column portion and overlying said bed portion, said plurality of structural portions being formed unitarily from a hardened body of nonmetallic material selected from the group which consists of a cement, ceramic and concrete containing dispersed and embedded therein, 0.5 to 15% by weight of discrete, fibrous metallic objects reinforcing said body without rendering the same significantly thermally and electrically conductive.*

12. *A machine tool frame comprising a plurality of structural portions including a bed portion, a column portion rising from said bed portion, and a head portion extending from said column portion and overlying said bed portion, said plurality of structural portions being unitarily formed from a continuous, rigid body which consists at least in major part of a ceramic.*

13. *The machine tool frame defined in claim 11 or 12, further comprising a metallic skeleton embedded in said body and extending into said plurality of structural portions.*

* * * * *